(No Model.)

C. E. NORDYKE.
FLY NET FOR THE LEGS OF HORSES.

No. 359,937. Patented Mar. 22, 1887.

Witnesses
Wm. A. Jones
Julius Solger

Inventor
Charles E. Nordyke.
per O. E. Duffy
Att'y.

UNITED STATES PATENT OFFICE.

CHARLES E. NORDYKE, OF WABASH, INDIANA, ASSIGNOR OF TWO-THIRDS TO WILLIAM H. BENT AND JESSE T. HUTCHENS, BOTH OF SAME PLACE.

FLY-NET FOR THE LEGS OF HORSES.

SPECIFICATION forming part of Letters Patent No. 359,937, dated March 22, 1887.

Application filed October 1, 1886. Serial No. 215,104. (No model.)

*To all whom it may concern:*

Be it known that I, CHARLES E. NORDYKE, a citizen of the United States, residing at Wabash, in the county of Wabash and State of Indiana, have invented a new and useful Fly-Net for the Legs of Horses, of which the following is a specification.

Heretofore the legs of horses have been unprotected by fly-nets covering other parts of the body, and the horse has been compelled to endure the sting of flies, or frighten them away by the constant stamping of his feet, to his and his master's great annoyance, and to the injury of the horse's feet and limbs and the loss of his shoes. By my net, put in motion by any movement of the horse's leg, the flies are kept off.

My invention consists of three or more circular bands, A A' A", as shown in Figure 1 of the drawings herewith, placed above each other, and held together by two upright strips of leather, B, in Fig. 1, and securely attached to each band on the inner opposite side thereof. The upper band, A, in Figs. 1 and 2, is elastic, and is adjusted around and above the horse's knee by means of a buckle, $d$. Each succeeding lower band is made of leather, and attached to the band next above it by means of the strap B and B'. The bands A' and A" are adjusted by means of buckles at $d'$ $d''$, but are not intended to fit tightly about the leg, and are supported in their places by means of the upright strap or cord B B', attached at the upper end to the elastic band A in Figs. 1 and 2, which band is fitted closely around the leg, as above stated, by means of the buckle $d$ in Fig. 2. Through the bands A A' A" in Fig. 2 openings are made at regular intervals, into each two of which the opposite ends of the dangles C are placed, from the inner side of the band, as shown in Fig. 2, A A' A", so as to let them hang down around the horse's leg from the outside of the band, as shown in Fig. 1, the dangles C reaching the band or foot next below, as the case may be. The dangles are the leather strings C pending from the bands A A' A", as shown in Figs. 1 and 2, and are sufficient in number and length to keep the flies off the leg to the band or foot next below, but not so long as to interfere with the horse's walking.

Figure 1:
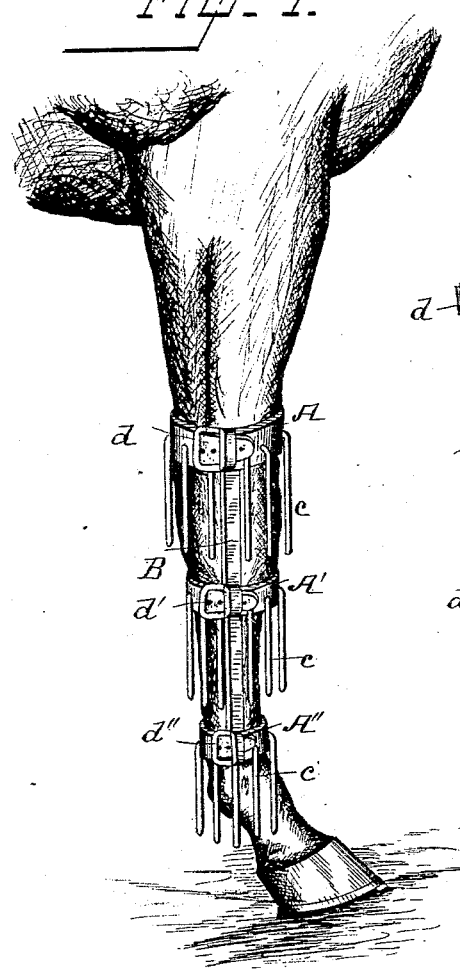
Fig. 1 shows the net as adjusted upon the horse's leg.
Figure 2:
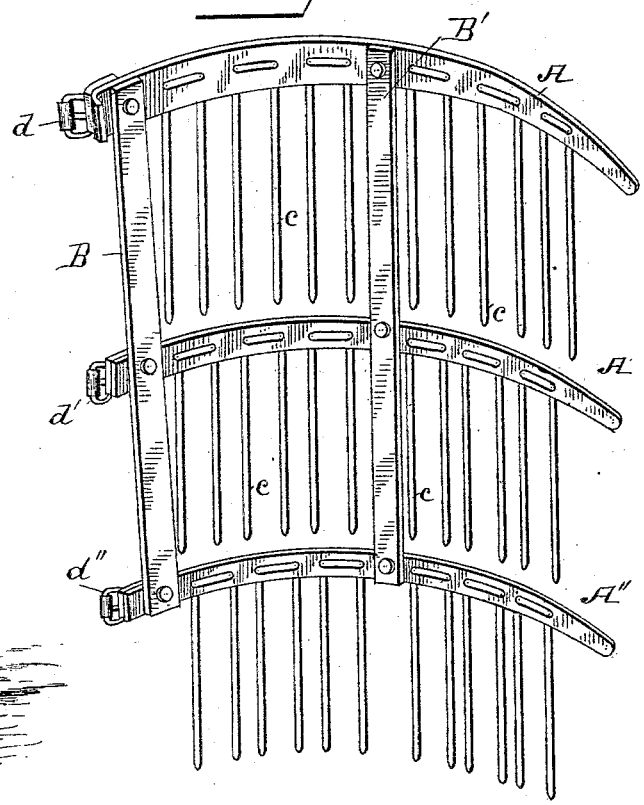
Fig. 2 shows the net removed from the leg, which is done by loosening the buckles at $d\ d'$ $d''$. The net in Fig. 2 represents the inside of the band out.

I am aware that fly-nets have been employed to protect the body and heads of horses, and do not desire to claim such as my invention; but

What I claim as my invention, and desire to secure by Letters Patent, is—

1. A fly-net for protecting the limbs of animals, consisting of an upper elastic strap and lower leather straps having dangles hanging therefrom and connected by upright straps, substantially as described.

2. In an animal-limb protector, an elastic strap connected to lower leather straps by upright straps, in combination with dangles, substantially as shown.

CHARLES E. NORDYKE.

Witnesses:
THOMAS BRIDGES,
BENJAMIN FRANKLIN GROSSNICKLE.